Patented July 13, 1937

2,086,562

UNITED STATES PATENT OFFICE 2,086,562

METHOD OF SEPARATING MIXED ERGOT ALKALOIDS

Willy Heinrich Küssner, Darmstadt, Germany, assignor to Merck & Co., Inc., Rahway, N. J., a corporation of New Jersey No Drawing. Application June 20, 1934, Serial No. 731,464. In Germany June 22, 1933

6 Claims. (Cl. 260—25)

The present invention relates broadly to improvements in the method of separating mixed ergot alkaloids, and more particularly it is concerned with the production of a new ergot alkaloid.

According to the process of Barger and Carr, [Journ. of the Chemical Society, London, vol. 91 (1907) pp. 337–353], aqueous solutions of salts of the combined ergot alkaloids are mixed with caustic alkalies and the liberated ergotinine extracted with organic solvents, after which the aqueous lye is neutralized, realkalized with sodium carbonate, and shaken out with ether. The residue of the ethereal solution is recrystallized as the phosphate from 80% alcohol. Barger's end product was therefore crystallized ergotoxine phosphate. It was noticed that with the process of Barger and Carr, the ergotoxine phosphate crystallizes out of the phosphoric-acid-alcoholic solution only after standing for a protracted period. Furthermore, a resinous substance is freed which renders separation of the ergotoxine crystals very difficult and requires further wasteful, repeated solutions.

By the present process, I have found that better yields of ergotoxine, in purer form, can be obtained by acidifying the caustic-alkaline aqueous solution (which has been freed from ergotinine), and then extracting, in the acid state, with an organic solvent. Lactic acid was found particularly suitable for acidulation of the caustic-alkaline aqueous solution, but the following acids have also been employed successfully— acetic, tartaric, hydrochloric, subphosphoric, and phosphoric. The organic solvents used in this extraction process may be the ordinary solvents used for the preparation of ergotoxine, but ether is preferable. The ergotoxine is found in the ethereal extract, and can be easily obtained by permitting it to crystallize out after evaporation. If desired, it may first be transformed into a salt.

By the process herein disclosed, the salts of ergotoxine crystallize out within a few hours and are free from resinous secretions such as are obtained in the preparation of ergotoxine phosphate according to the Barger and Carr process, as already pointed out. The ergotoxine phosphate, for instance, is obtained in the form of nearly-white well-formed crystals having a melting point of 170–171°. In order to obtain a product of similar purity by the Barger and Carr process it is necessary to re-dissolve the ergotoxine phosphate several times, and this causes the yield to fall considerably below that obtained by my process.

Furthermore, according to my invention, the first extraction of the caustic-alkaline solution of the complete extract contains principally ergotinine, besides substantial quantities of ergotoxine. The former crystallizes out of the evaporation residue. The mother liquors containing the ergotoxine may advantageously be added to the solution to be acidulated, from which the ergotoxine is obtained.

After extraction of the ergotoxine according to my above-described process, I found that a hitherto unknown alkaloid remained in the acidulated aqueous solution. According to my method, this new alkaloid is obtained by alkalizing the acidulated aqueous solution, from which the ergotoxine has been produced, with alkali metal carbonates such as, for instance, sodium carbonate or bicarbonate, and thereafter extracting with suitable organic solvents. For this latter step of the process, organic solvents as possess a high degree of solvency should be preferably used, for example, chlorinated hydrocarbons-chloroform, dichlorethylene trichlorethylene—are suitable. Ordinarily, the new alkaloid crystallizes out immediately from the residue of the organic solvent used in the extraction after concentration of the solution. It is then further refined by recrystallization, preferably from aqueous alcohol or trichlorethylene. The new alkaloid can thus be obtained in a yield of approximately 20% of the combined alkaloids employed.

In general, then, the new alkaloid is obtained by removing from the combined alkaloid mixture prepared from ergot in the usual manner, all ingredients slightly soluble in caustic-alkalized or acidulated aqueous solutions by extracting with organic solvents, mixing the remaining aqueous solution with alkali carbonates, and thereafter treating the solution in the manner hereinbefore described.

This new alkaloid is highly active physiologically, and has been found to be as effective as the highly active alkaloid known as ergotamine. It melts at 170–171° when dried to weight constancy over phosphoruspentoxide at 20° C. and about 20 mm. pressure. In 1% chloroform solution it is dextro-rotatory $$[\alpha]\frac{20}{D} = +110°$$

Thus dried and in finely ground form, it liberates still more water when heated for several hours to 80° over phosphoruspentoxide at 1–2 mm. pressure under tumorescence. The completely dehydrated, very hygroscopic product has a melting point of 177–178° and the rotation $$[\alpha]\frac{22}{D} = +124°$$

(1% in chloroform). The crystallized new alkaloid has the approximate formula $C_{31}H_{37}N_5O_5 \cdot H_2O$.

The above characteristics distinguish my new product from alkaloids already known, such as ergotamine, ergotaminine, ergotoxine, ergotinine, and "Sensibamin". It is particularly distinguished from the alkaloid "Sensibamin" which is described in British Patent No. 388,529. While "Sensibamin" is unstable in alcohol, ether, acetone, and the like, my new alkaloid may be recrystallized from these solvents without changing its properties. For instance, ethanol (96%) dissolves the new alkaloid at 20° in a proportion of 1:33; when the ethanol is at boiling temperature the proportion is 1:6.

The various steps of my process are set forth in the accompanying examples. Obviously, these steps may be modified considerably with respect to their order and number and the specific materials used, without departing from the spirit of the invention substantially as described and claimed, and it is understood that I do not desire to limit myself to the specific embodiments shown.

*Example 1*

1000 grams of 1% aqueous solution of salts of the combined ergot alkaloids, obtained by the usual method, are mixed with 30 grams caustic soda (specific gravity 1.34) and thereafter extracted with 500, 250, and 250 cc. ether, respectively. The ethereal solution is evaporated and from it the ergotinine (30 to 50% of the combined alkaloids, depending upon the source), is obtained by crystallizing out and recrystallization. The mother liquids of the ergotinine production are mixed with the caustic-alkaline-aqueous alkaloid solution and the latter acidulated with 30 grams lactic acid (specific gravity 1.16). This acid solution is extracted with 400, 200, and 200 cc. ether, respectively, and from the ether, the ergotoxine (10–20% of the combined alkaloids) is obtained as the phosphate by evaporation, after treating with diluted alcoholic solution of phosphoric acid, permitting it to crystallize out, and subsequently recrystallizing it. The acidulated, aqueous alkaloid solution is weakly alkalized with sodium carbonate and extracted with trichlorethylene (200, 100, 100 cc., respectively); the dried trichlorethylene solution is concentrated in vacuo to 50 cc. and left standing for 12–24 hours in a cool, dark place, whereupon the newly crystallized alkaloid is filtered off by suction. This is recrystallized to a constant melting point, for instance from the five-fold quantity of 90% ethanol, the ten-fold quantity of benzol, or the 20-fold quantity of trichlorethylene. The yield is approximately 20% of the raw bases employed.

*Example 2*

The procedure is the same as in Example 1, and the same quantitative proportions are used, but instead of ether and trichlorethylene, benzol is used for extracting the fractions of ergotinine, ergotoxine, and the new base. The results are substantially the same.

*Example 3*

The process for fractionating ergotinine and ergotoxine is carried out as illustrated in Example 1. For extracting the fraction of the new alkaloid, methylene chloride or chloroform is used. Recrystallization is the same as in Example 1.

What I claim is:—

1. A new ergot alkaloid of the approximate formula $C_{31}H_{37}N_5O_5 \cdot H_2O$ which when dried to weight constancy at 20° C. and 20 mm. pressure has a melting point of 170–171° C. and dextro-rotation $$[\alpha]\frac{20}{D} = +110°$$

and which when dried at 80° and about 1–2 mm. pressure has a melting point of 177–178° C. and dextro-rotation $$[\alpha]\frac{22}{D} = +124°$$

and which is characterized by its stability in alcohol, ether, acetone, and other usual organic solvents.

2. An improved process for producing ergotoxine from a mixture of the combined salts of the ergot alkaloids obtained by conventional methods, which comprises alkalizing an aqueous solution of such mixed salts of said alkaloids with caustic alkali, repeatedly extracting with ether, evaporating the solvent to crystallize out the ergotinine content, combining the mother liquid of the ergotinine production with the original alkalized aqueous alkaloidal solution, acidulating the combined solutions with lactic acid, extracting the combined acidulated solutions with ether, treating the extraction product with a dilute alcoholic solution of phosphoric acid, and evaporating the solvent to crystallize out ergotoxine in the form of phosphate.

3. An improved process for producing ergotoxine from a mixture of the combined salts of the ergot alkaloids obtained by conventional methods, which comprises alkalizing a unit quantity of about 1,000 parts of an aqueous solution of such mixed salts of said alkaloids with caustic alkali, successively extracting with 500, 250 and 250 parts of ether, evaporating the solvent to crystallize out the ergotinine content, combining the mother liquid of the ergotinine production with the original alkalized aqueous alkaloidal solution, acidulating the combined solutions with lactic acid, extracting the combined acidulated solutions with 400, 200 and 200 parts of ether, treating the extraction product with a dilute alcoholic solution of phosphoric acid, and evaporating the solvent to crystallize out ergotoxine in the form of phosphate.

4. A process for producing a new ergot alkaloid from a solution of combined ergot alkaloids previously substantially freed from ergotinine and ergotoxine, which comprises the steps of weakly alkalizing the acidulated aqueous residual alkaloidal solution remaining after such extraction, with alkali metal carbonates, repeatedly extracting the alkalized solution with a chlorinated hydrocarbon of the group consisting of chloroform, dichlorethylene, and trichlorethylene, and evaporating the solvent to crystallize out the new alkaloid, described in claim 1.

5. A process for producing a new ergot alkaloid from a solution of combined ergot alkaloids previously substantially freed from ergotinine and ergotoxine, which comprises the steps of weakly alkalizing the acidulated aqueous residual alkaloidal solution remaining after such extraction, with sodium carbonate, repeatedly extracting the alkalized solution with trichlorethylene, and evaporating the solvent to crystallize out the new alkaloid described in claim 1.

6. A process for the separation of certain ergot alkaloids which comprises mixing aqueous solutions of salts of the combined ergot alkaloids, obtained by conventional methods, with caustic alkali, extracting the mixture with ether, evaporating the solvent to crystallize out the ergotinine content, combining the mother liquid of the ergotinine production with the original alkalized aqueous alkaloidal solution, acidulating the combined solutions with lactic acid, extracting the combined acidulated solutions with ether, treating the extraction product with a dilute alcoholic solution of phosphoric acid, evaporating the solvent to crystallize out ergotoxine in the form of phosphate, weakly alkalizing the acidulated aqueous residual alkaloidal solution with alkali metal carbonates, extracting this last-named solution with a chlorinated hydrocarbon of the group consisting of chloroform, dichlorethylene, and trichlorethylene, and evaporating the solvent to crystallize out the new alkaloid described in claim 1.

WILLY HEINRICH KÜSSNER.